(12) United States Patent
Ahmed

(10) Patent No.: US 9,742,290 B2
(45) Date of Patent: Aug. 22, 2017

(54) CONTROL ARRANGEMENT FOR INCREASING THE AVAILABLE OUTPUT FROM A SOURCE

(71) Applicant: University of Plymouth, Plymouth, Devon (GB)

(72) Inventor: Mohammed Ahmed, Wembury (GB)

(73) Assignee: University of Plymouth, Plymouth, Devon (GB)

( * ) Notice: Subject to any disclaimer, the term of this patent is extended or adjusted under 35 U.S.C. 154(b) by 0 days.

(21) Appl. No.: 14/905,523

(22) PCT Filed: Jul. 10, 2014

(86) PCT No.: PCT/GB2014/052104
§ 371 (c)(1),
(2) Date: Jan. 15, 2016

(87) PCT Pub. No.: WO2015/008035
PCT Pub. Date: Jan. 22, 2015

(65) Prior Publication Data
US 2016/0156270 A1  Jun. 2, 2016

(30) Foreign Application Priority Data
Jul. 15, 2013  (GB) .................................. 1312621.4

(51) Int. Cl.
*H02M 3/335* (2006.01)
*H02J 3/38* (2006.01)

(52) U.S. Cl.
CPC ......... *H02M 3/33507* (2013.01); *H02J 3/385* (2013.01); *Y02E 10/58* (2013.01)

(58) Field of Classification Search
CPC ............. H02M 3/335; H02M 3/33507; H02M 3/33523; H02M 3/33569; H02M 3/33592;
(Continued)

(56) References Cited

U.S. PATENT DOCUMENTS 4,533,836 A * 8/1985 Carpenter ......... H02M 3/33561
307/11
4,722,041 A * 1/1988 Ishikawa .................. H03K 3/30
323/289

(Continued)

FOREIGN PATENT DOCUMENTS

| EP | 2256579 | 12/2010 |
|---|---|---|
| EP | 2339712 | 6/2011 |
| WO | 2013004110 | 1/2013 |

OTHER PUBLICATIONS

Examination Report for GB1412257.6 dated Aug. 28, 2015.
(Continued)

*Primary Examiner* — Yemane Mehari
(74) *Attorney, Agent, or Firm* — Andrus Intellectual Property Law, LLP

(57) ABSTRACT

A control arrangement for use in controlling the electrical supply from a power supply unit including an internal capacitance to an output is described, the control arrangement comprising an inductor, a switch arranged in parallel with internal capacitance, and a controller operable to control the operation of the switch such that closing of the switch results in the formation of an LCR circuit, the internal capacitance forming the capacitance of the LCR circuit. An associated control method is also described.

10 Claims, 3 Drawing Sheets

(58) Field of Classification Search
CPC ........... H02M 1/36; H02M 2001/0032; H02M 2007/4815; Y02B 70/1433; Y02B 70/1441; Y02B 70/1443; Y02B 70/1475; H02J 3/385
USPC .......................................... 363/21.01–21.18
See application file for complete search history.

(56) References Cited

U.S. PATENT DOCUMENTS

| | | | |
|---|---|---|---|
| 5,710,699 A * | 1/1998 | King | B60L 11/005 318/139 |
| 2002/0163323 A1 * | 11/2002 | Kasai | G05F 1/67 323/284 |
| 2004/0207366 A1 | 10/2004 | Sung | |
| 2006/0164065 A1 | 7/2006 | Hoouk | |
| 2008/0084117 A1 | 4/2008 | Sander | |
| 2008/0183338 A1 | 7/2008 | Kimball | |
| 2009/0086514 A1 | 4/2009 | Fornage | |
| 2009/0115393 A1 * | 5/2009 | Yoshida | G05F 1/67 323/300 |
| 2010/0132757 A1 | 6/2010 | He | |
| 2011/0001360 A1 | 1/2011 | Rua | |
| 2011/0012429 A1 | 1/2011 | Fornage | |
| 2011/0210614 A1 | 9/2011 | Min | |
| 2011/0249474 A1 | 10/2011 | Luo | |
| 2012/0087159 A1 | 4/2012 | Chapman | |
| 2012/0155126 A1 | 6/2012 | Yoneda | |
| 2013/0141949 A1 | 6/2013 | Yu et al. | |

OTHER PUBLICATIONS

International Search Report and Written Opinion for PCT/GB2014/052104 dated Sep. 10, 2014.

Examination Report for United Kingdom Application No. GB1412257.6 dated Nov. 18, 2016.

* cited by examiner

CONTROL ARRANGEMENT FOR INCREASING THE AVAILABLE OUTPUT FROM A SOURCE

CROSS REFERENCE TO RELATED APPLICATIONS

The present application is the U.S. national stage application of International Application PCT/GB2014/052104, filed Jul. 10, 2014, which international application was published on Jan. 22, 2015, as International Publication WO2015/008035. The International Application claims priority of British Patent Application 1312621.4, filed Jul. 15, 2013, the contents of which are incorporated herein by reference in their entireties.

This invention relates to a control arrangement, and in particular to a control arrangement suitable for use with a photovoltaic or solar panel (referred to hereinafter as a solar panel) to increase the available output therefrom. Whilst especially suitable for use in conjunction with a solar panel, the control arrangement may be used with a range of other devices or power supplies.

BACKGROUND

Solar panels are in increasingly widespread use in the generation of electricity. The outputs therefrom may be used directly in driving other devices, or may be used in charging electrical storage means or in supplying power to the mains electricity network. As the output of a solar panel varies, non-linearly, depending upon, for example, the intensity of the light incident thereon, the operating temperature, and other factors, the direct, uncontrolled supply of the output from the solar panel to a load is usually inappropriate. FIG. 1 illustrates, diagrammatically, a typical I-V output of a solar panel under a range of incident light intensities, showing the relationship between the generated current and the associated output voltage. The maximum power output occurs if the circuit, of which the solar panel forms part, is operating on the line 10 in FIG. 1. Clearly, as the light intensity changes, the operating current and voltage required for the maximum output vary. In order to ensure that the solar panel and associated circuit operate at around the point of maximum power, a maximum power point tracking algorithm is used. The output of the maximum power point tracking algorithm is used in varying the load supplied by the solar panel, for example switching in or out resistances thereof, in an attempt to maintain the operation of the solar panel at around its optimum point.

In some older systems the algorithm operates to ensure that the circuit operates at 70% of the open circuit voltage. This is achieved by repeatedly and rapidly connecting disconnecting the supply, ie the output from the solar panel, from the load. By way of example, the supply may be connected and disconnected in the region of 1000 to 3000 times per second. By disconnecting the output for a proportion of the time in this manner, the duty cycle is reduced, for example to around 70% as mentioned above.

Whilst such a system may operate satisfactorily in some circumstances, when the supply is disconnected there is no output from the panel to the load and consequently, even if the panel would otherwise be operating at the maximum power point, potential power is being lost whilst the panel is disconnected. The arrangement is therefore less efficient than it could be.

SUMMARY

It is an object of the invention to provide a control arrangement whereby the useful output of a panel can be enhanced and, preferably optimised.

According to the present invention there is provided a control arrangement for use in controlling the electrical supply from a power supply unit including an internal capacitance to an output, the control arrangement comprising an inductor, a switch arranged in parallel with internal capacitance, and a controller operable to control the operation of the switch such that closing of the switch results in the formation of an LCR circuit, the internal capacitance forming the capacitance of the LCR circuit.

In such an arrangement there is no need to provide a maximum power point tracking algorithm or the like, and preferably no such algorithm or the like is present.

A pn junction diode, by its nature, forms a variable junction capacitance. Such a diode is typically present in a unit including a solar panel. This junction capacitance has, in the past, been ignored when modeling the output of a solar panel and associated control circuit. Where such a diode is arranged in parallel with a voltage source such as a solar panel, part of the supply is used, initially, in charging the junction capacitance.

Furthermore, where the voltage source takes the form of a solar panel, the source itself will in effect form a capacitance which will also become charged. As the output of a solar panel is not uniform but varies with, for example, incident light intensity, temperature and other factors, the charge on the capacitance(s) is constantly varying. The capacitor current associated with the internal capacitance can thus either be positive or negative depending upon whether, at any given point in time, the capacitance is being charged or is discharging. In a conventionally arranged solar panel, the direction of this current will depend upon, for example, whether the intensity of the illumination is increasing or decreasing. However, in the arrangement outlined hereinbefore, extraction of the internal capacitance energy is achieved through the operation of the switch in a controlled manner, thereby allowing the operation of the overall system with an enhanced level of efficiency.

In the arrangement of the invention, when the switch is open, the internal capacitance of the unit will charge. Closing of the switch will result in discharge of the internal capacitance into the inductor. By appropriate control over the operation of the switch it will be appreciated that the output from the power supply unit which would otherwise just go towards charging of the internal capacitance can instead be extracted for use. When the switch is opened again, resulting in the internal capacitance recharging, energy can be extracted from the inductor and used to satisfy the demands of a load connected thereto. Furthermore, when the switch is closed, the output current from the power supply unit flows through the inductance resulting in energy storage therein. When the switch is opened, power is supplied to the load. As long as the output current from the power supply is supplied continuously to the inductance, and the inductor current rises upon closing of the switch and decreased upon opening of the switch, the output voltage from the control arrangement will be greater than then input voltage thereto.

Preferably, the controller causes the switch to move between its opened and closed positions at a frequency in the range of 150-700 kHz, preferably 600-700 kHz, for example at a frequency of the order of 650 kHz. Variation of the size of the inductance changes the frequency at which the switch should be operated.

Where the power supply unit includes an inverter, such as a string inverter or a microinverter used in conjunction with a solar panel, the control arrangement may be incorporated into the inverter or may comprise a module adapted for connection thereto.

The invention further relates to a method for controlling the output of unit using a control arrangement of the form outlined hereinbefore, the method comprising the steps of:

opening the switch, thereby allowing the internal capacitance of the unit to become charged;

closing the switch, thereby allowing the internal capacitance of the unit to discharge, supplying an increased current to the inductor; and re-opening the switch, thereby allowing the internal capacitance of the unit to become recharged whilst extracting energy from the inductor to satisfy the electrical demand of a load.

BRIEF DESCRIPTION OF THE DRAWINGS

The invention will further be described, by way of example, with reference to the accompanying drawings, in which.

DETAILED DESCRIPTION OF THE DRAWINGS

Figure 1:
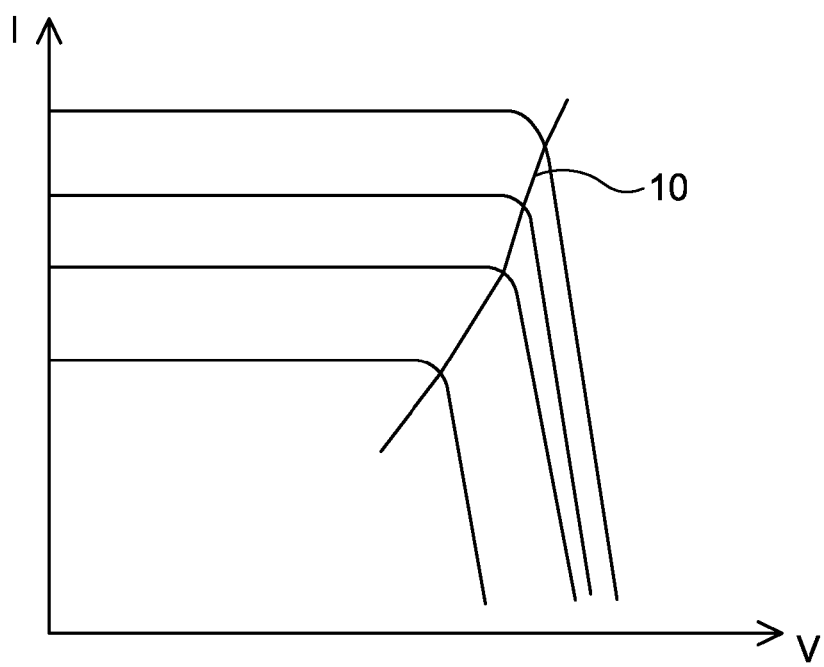
FIG. 1 is a diagram illustrating the I-V output relationship for a typical solar panel unit under a range of incident light intensities.

As illustrated in FIG. 1 and discussed hereinbefore, the output of solar panels varies significantly depending upon a number of factors, not least of which is the intensity of the light incident upon the solar panel as any given time.

Figure 2:
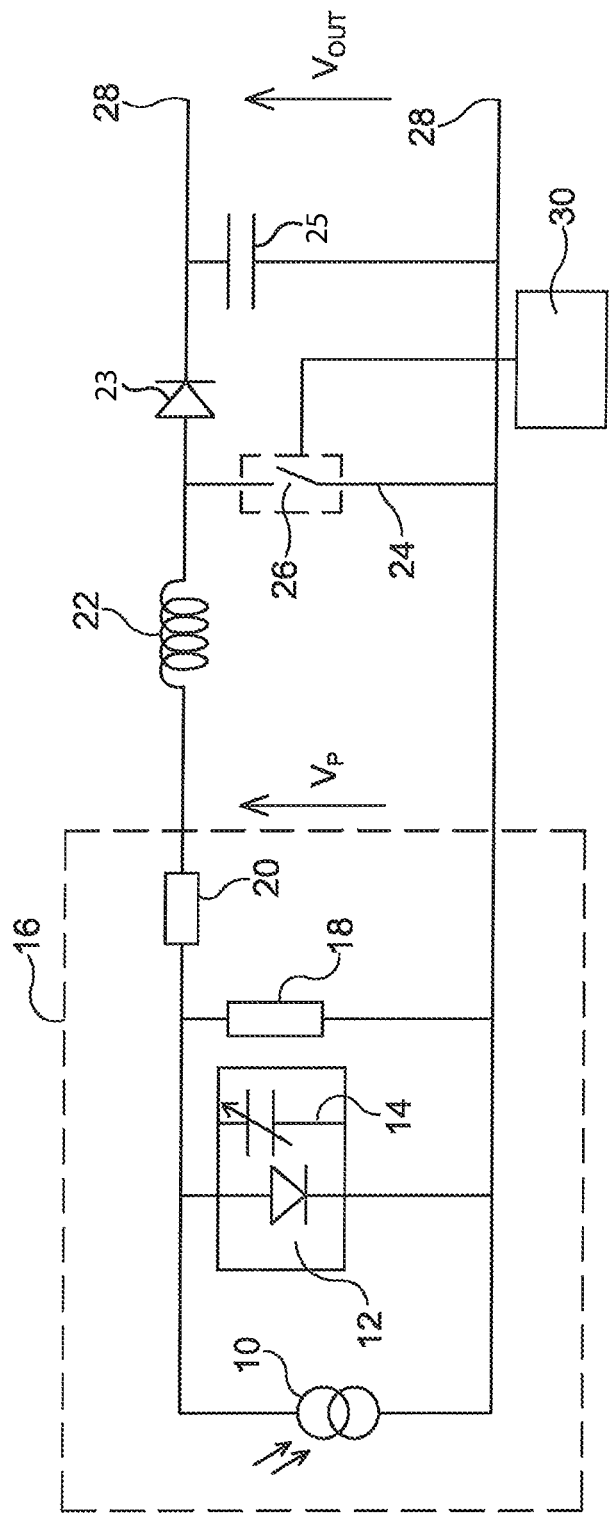
FIG. 2 is a diagram illustrating a control arrangement according to an embodiment of the invention.

Referring to FIG. 2, a circuit diagram of a control arrangement in accordance with an embodiment is illustrated. The circuit diagram is representative of a control arrangement used in controlling the output from a solar panel in order to allow the maximum power to be extracted therefrom. Whilst described in connection with a solar panel, it will be appreciated that the invention may be used in other applications in which it is desired to enhance the level of power that can be extracted from a unit including a variable voltage source and an internal capacitance.

As shown in FIG. 2, a solar panel 10 has, connected across the terminals thereof, a pn junction diode 12. Such a diode 12 has an internal, junction capacitance illustrated in FIG. 2 by the capacitance 14. Whilst not illustrated, the solar panel 10 will also have a diffusion capacitance associated therewith. The panel 10 and diode 12 are typically supplied as a single unit, denoted by dashed lines 16 in FIG. 2, with constant resistances 18, 20 reflecting resistances present within the unit 16, and with the junction capacitance 14 and diffusion capacitance constituting a variable internal capacitance of the unit 16. $V_p$ thus represents the voltage output from the unit 16. It will be appreciated that this output is variable for the reasons discussed hereinbefore.

The output from the unit 16 is supplied to an inductor 22, a line 24 including a switch 26 being provided and arranged such that when the switch is open, the output of the panel 10 serves to charge the internal capacitance of the unit 16 and also serves to satisfy the requirements of a load connected to output terminals 28, which are connected to the inductor 22 via a diode 23 and capacitor 25. $V_{out}$ represents the output voltage from the control arrangement. The inductance of the inductor 22 is relatively small, being selected to match the characteristics of the solar panel 10 and the internal capacitance thereof.

Figure 3:
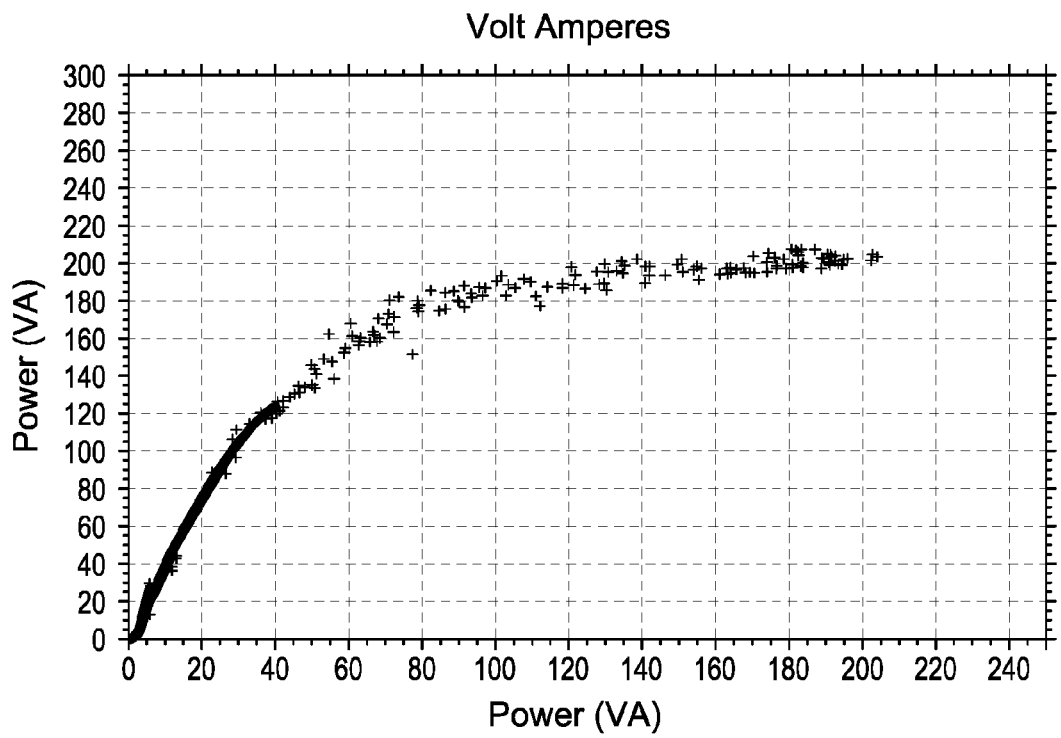
FIG. 3 is a graph comparing the output of the control arrangement of FIG. 2 with a conventional solar panel control arrangement.

When the switch 26 is closed, the internal capacitance of the unit 16 is able to discharge, the closing of the switch 26 in the line 24 resulting in the formation of an LCR circuit, the discharge from the internal capacitance being supplied to the inductor 22, increasing the current supply thereto such that upon subsequent reopening of the switch 26, energy from the inductor 22 can be extracted and used in satisfying the load. When the switch 26 is closed the increased output current from the unit 16 is supplied to the inductance 22, resulting in energy storage therein. Subsequent opening of the switch allows power to be extracted from the inductance 22 and supplied to the load whilst also resulting, once more, in charging of the internal capacitance. Provided the output current from the unit 16 is supplied continuously to the inductance 22 and the inductor current rises when the switch 26 is closed and falls when the switch 26 is opened (and the control unit 30 mentioned below is operated in such a manner as to ensure that the is the case) then the value of $V_{out}$ will be greater than $V_p$. FIG. 3 demonstrates this, the outputs (in Volt-Amperes) of a conventionally controlled panel (horizontal axis) and a panel controlled using the aforementioned control arrangement (vertical axis) under the same environmental conditions, the panels having the same operating characteristics other than in relation to the control thereof, being plotted against one another and clearly showing that the $V_{out}$ is greater, often significantly greater, than $V_p$.

The frequency of operation of the switch 26 is chosen so as to maintain this effect. The frequency may thus be chosen to maintain resonance, or may be a harmonic of a frequency that would maintain resonance. As the internal capacitance of the unit 16 is not fixed, it will be appreciated that the optimum switching frequency is also not fixed. However, it will typically be in the region of 150 to 700 kHz, preferably 600 kHz to 700 kHz. The optimum switching frequency will depend, at least to some degree, upon the size of the inductance.

The operation of the switch 26 is controlled by an appropriate controller 30 which serves to controlling the timing and frequency of operation of the switch 26. As mentioned hereinbefore, to some degree the frequency of operation of the switch 26 should be varied to compensate for variations in the internal capacitance of the unit 16. However, it is anticipated that the variation in frequency required to take into account such variations will be fairly small and that the variations in the switching frequency will typically be in the region of 50-60 Hz. The controller 30 conveniently monitors, for example, the output $V_p$ from the unit 16, uses this to provide an indication of the internal capacitance of the unit 16 at that time, and controls the switching frequency in response to this in order to maximize or substantially maximize the power output. However, it will be appreciated that other techniques to determine the optimum, or a desirable, switching frequency are possible without departing from the scope of the invention.

The use of the control arrangement outlined hereinbefore is advantageous in that is allow the useful output of the solar panel unit 16 to be enhanced whilst avoiding the need to employ a complex maximum power point tracking algorithm, and avoiding the inefficiencies associated therewith. The control arrangement is preferably located close to the unit 16 to minimize the effects of inductances associated with the connecting cables. It could, for example, be incorporated into an inverter such as a string inverter or microinverter associated with the unit 16, or as a module to be connected thereto.

Figure 4:
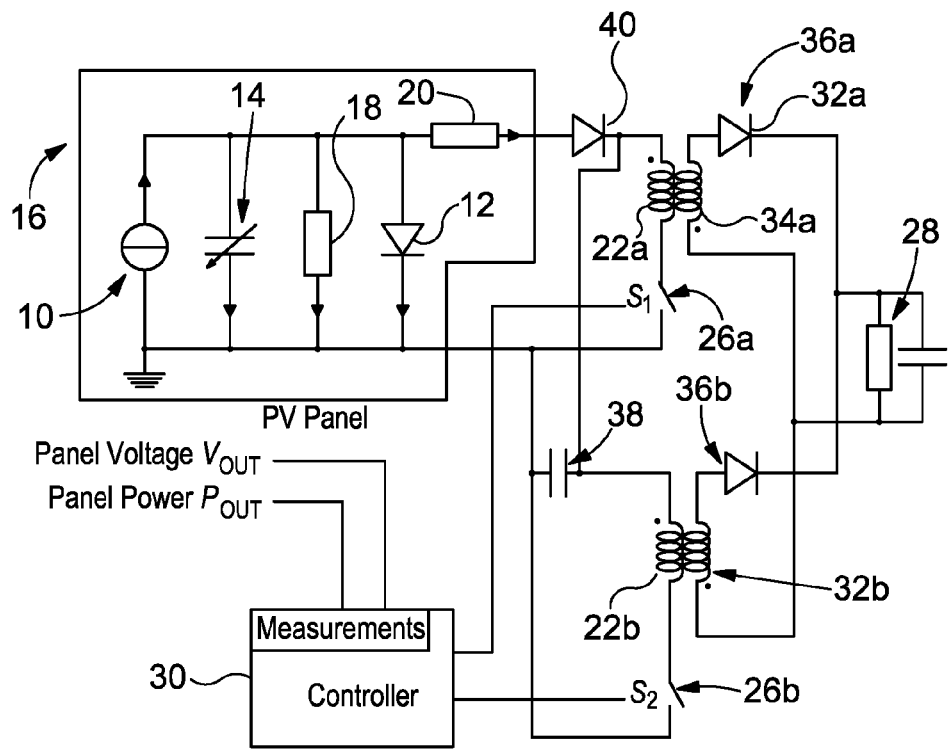
FIG. 4 is a diagram illustrating an alternative embodiment.

Turning to FIG. 4, and alternative circuit configuration is illustrated. In the arrangement of FIG. 4, rather than provide a single inductance 22, a pair of inductances 22a, 22b are provided in respective legs of the circuit, each inductance 22a, 22b having a respective switch 26a, 26b associated therewith, the operation of the switches 26a, 26b being controlled by a controller 30 as described hereinbefore.

Each inductance 22a, 22b forms the input coil of a respective bifilar inductor 32a, 32b, the output coils 34a, 34b being connected to and supplying the output voltage to the load, in use. The input and output coils of each bifilar inductor 32a, 32b share a common core and so are magnetically coupled to one another. Blocking diodes 36a, 36b are provided to prevent the bifilar inductors 32a, 32b acting as transformers. In use, when switch 26a is closed, the internal capacitance 14 discharges and increases the current supply to the inductance 22a resulting in energy storage therein. Subsequent opening of the switch 26a results in the internal capacitance 14 charging and in energy discharge from the inductance 22a in the manner outlined hereinbefore. Whilst energy is being discharged from the inductance 22a, switch 26b can be closed to discharge the internal capacitance 14 increasing the current supply to the inductance 22b, subsequent opening of the switch 26b again allowing the internal capacitance 14 to charge and in energy discharge from the inductance 22b to the load.

Accordingly, starting from a position in which both switches 26a, 26b are open, and so the internal capacitance 14 is charging, at a selected point in time the switch 26a is closed resulting in discharge of the internal capacitance 14. Switch 26a is then opened to recharge the capacitance and commence discharge the inductor 22a. Switch 26b is then closed to discharge the internal capacitance 14 and is then reopened to recharge the capacitance 14 and commence energy discharge from the inductor 22b. Before reopening each switch 26a, 26b, it may be beneficial to include a period during which both switches 26a, 26b are closed. The timings at which the commencement of each charging and discharging cycle of the unit 16 occurs will depend, in part, upon the prevailing environmental conditions, thus the switching frequency will not normally be fixed if the efficiency of the control arrangement is to be maximized. An appropriate control algorithm may be used to control the times at which the switches 26a, 26b are opened and closed, for example to maximize the output. The algorithm may be controlled depending upon the output voltage from the panel 16, for example.

It will be appreciated that by appropriate control over the times at which the switches 26a, 26b are moved between their open and closed positions, the output of the control arrangement may be optimized.

The capacitance 38 and diode 40 are provided to reduce the back EMF from the inductors 32a, 32b charging the unit 16. The capacitance 38 is smaller than the internal capacitance of the unit 16.

It is thought that the use of the invention may allow greater flexibility over the location and orientation in which units 16 may be employed as the use of the invention may allow a useful output to be generated in situations in which no such useful output would otherwise be produced. Useful generation under reduced intensity lighting conditions (or with units not orientated optimally) or under unfavourable temperature conditions may be possible.

Whilst specific embodiments of the invention are described hereinbefore, it will be appreciated that a number of modifications and alterations to the arrangement may be made without departing from the scope of the invention.

The invention claimed is:

1. A control arrangement for use in controlling the electrical supply from a power supply unit including an internal capacitance to an output, the control arrangement comprising an inductor of small inductance that matches the internal capacitance, a switch arranged in parallel with internal capacitance, and a controller operable to control the operation of the switch such that closing of the switch results in the formation of an LCR circuit, the internal capacitance forming the capacitance of the LCR circuit, wherein the controller is operable to cause the switch to move between open and closed positions at a high frequency in the range of 150 kHz-700 kHz.

2. An arrangement according to claim 1 and in which no maximum power point tracking algorithm is provided.

3. An arrangement according to claim 1, wherein the internal capacitance is a variable capacitance, and the controller causes the switch to move between its opened and closed positions at a frequency chosen to maintain resonance, or a harmonic of a frequency which would maintain resonance, depending upon the instantaneous internal capacitance.

4. An arrangement according to claim 1, wherein the supply unit comprises a solar panel.

5. An arrangement according to claim 1, wherein the internal capacitance is formed, at least in part, for the junction capacitance of a pn junction diode located within the unit.

6. An arrangement according to claim 1, in which two inductances are provided in parallel with one another, a respective switch being associated with each inductance.

7. An arrangement according to claim 6, wherein each inductance forms part of a bifilar winding, and wherein blocking diodes are provided.

8. A method for controlling the output of a power supply unit using a control arrangement as claimed in claim 1, the method comprising the steps of:
   opening the switch, thereby allowing the internal capacitance of the unit to become charged;
   closing the switch, thereby allowing the internal capacitance of the unit to discharge, increasing the current supplied to the inductor; and
   re-opening the switch, thereby allowing the internal capacitance of the unit to become recharged whilst extracting energy from the inductor to satisfy the electrical demand of a load,
   wherein the opening and closing of the switch is undertaken at a high frequency in the range of 150 kHz to 700 kHz.

9. A method according to claim 8, wherein opening and closing of the switch is controlled by a controller which causes the switch to move between its opened and closed positions at the high frequency.

10. A control arrangement for use in controlling the electrical supply from a power supply unit including an internal capacitance to an output, the control arrangement comprising an inductor, a switch arranged in parallel with internal capacitance, and a controller operable to control the operation of the switch such that closing of the switch results in the formation of the LCR circuit, the internal capacitance forming the capacitance of the LCR circuit, wherein the internal capacitance is a variable capacitance, and the controller causes the switch to move between its open and closed positions at a frequency chosen to maintain resonance, or a harmonic of a frequency which would maintain resonance, depending upon the instantaneous internal capacitance.

\* \* \* \* \*